United States Patent [19]

Rachi et al.

[11] Patent Number: 4,540,589
[45] Date of Patent: Sep. 10, 1985

[54] PROCESS FOR PRODUCING FIBROUS SIMULATED SEA FOODS PACKAGED IN HERMETICALLY SEALED CONTAINERS

[75] Inventors: Kazuo Rachi, Shizuoka; Shouichi Kubota, Shimizu; Isamu Sasaki, Koganei, all of Japan

[73] Assignee: Nippon Suisan Kabushiki Kaisha, Tokyo, Japan

[21] Appl. No.: 511,082

[22] Filed: Jul. 5, 1983

[30] Foreign Application Priority Data

Jul. 8, 1982 [JP] Japan ................... 57-118856

[51] Int. Cl.$^3$ .................. A23L 1/325; A23L 3/00
[52] U.S. Cl. .................... 426/250; 426/249; 426/574; 426/643; 426/802; 426/407
[58] Field of Search ............. 426/643, 412, 407, 129, 426/332, 513, 802, 325, 249, 250, 574

[56] References Cited

U.S. PATENT DOCUMENTS

| | | | |
|---|---|---|---|
| 2,959,488 | 11/1960 | Van de Kerke | 426/407 |
| 3,532,512 | 10/1970 | Joaquin | 426/643 |
| 3,852,487 | 12/1974 | Van Werven et al. | 426/643 |
| 3,863,017 | 1/1975 | Yuen | 426/513 |
| 3,928,652 | 12/1975 | Lanter | 426/643 |
| 4,055,676 | 10/1977 | Foulkes | 406/332 |
| 4,073,956 | 2/1978 | Yates | 426/802 |
| 4,136,210 | 1/1979 | Noguchi et al. | 426/802 |
| 4,158,065 | 6/1979 | Sugino | 426/513 |
| 4,233,320 | 11/1980 | Monaco et al. | 426/399 |
| 4,303,688 | 12/1981 | Shimura et al. | 426/513 |
| 4,362,752 | 12/1982 | Sugino | 426/802 |
| 4,396,634 | 8/1983 | Shenouda et al. | 426/513 |

FOREIGN PATENT DOCUMENTS

| | | | |
|---|---|---|---|
| 2514110 | 10/1976 | Fed. Rep. of Germany | 426/643 |
| 45-31910 | 10/1970 | Japan | 426/407 |
| 51-9757 | 1/1976 | Japan | 426/643 |
| 51-67751 | 6/1976 | Japan | 426/332 |
| 51-86165 | 7/1976 | Japan | 426/643 |
| 53-47561 | 4/1978 | Japan | 426/643 |
| 53-41454 | 4/1978 | Japan | 426/332 |
| 55-77877 | 6/1980 | Japan | 426/643 |
| 55-38107 | 10/1980 | Japan | 426/643 |
| 56-78577 | 6/1981 | Japan | 426/332 |
| 57-118768 | 7/1982 | Japan | 426/643 |
| 57-118767 | 7/1982 | Japan | 426/643 |
| 57-125677 | 8/1982 | Japan | 426/643 |
| WO82/02819 | 9/1982 | PCT Int'l Appl. | 426/643 |

*Primary Examiner*—Steven Weinstein
*Attorney, Agent, or Firm*—Wenderoth, Lind & Ponack

[57] ABSTRACT

Fibrous simulated sea foods packaged in hermetically sealed containers are produced by kneading a minced fish meat to which sodium chloride has been added, molding the kneaded meat into the form of noodle-like strips, preparing fibrous fish meat by forming cuttings like the teeth of a comb on the noodle-like strips or cutting the noodle-like strips into the form of noodle-like filaments, sheafing and binding the fibrous fish meat by the use of a binder containing kneaded krill meat, and, after coloring a part of the surface of the bound product according to necessity, heating under pressurization the bound product packaged in a heat-resistant container.

7 Claims, No Drawings

PROCESS FOR PRODUCING FIBROUS SIMULATED SEA FOODS PACKAGED IN HERMETICALLY SEALED CONTAINERS

BACKGROUND OF THE INVENTION

1. Field of the Invention

This invention relates to simulated sea foods packaged in hermetically sealed containers and a process for producing the same.

2. Description of the Prior Art

"Kamaboko" (fish cake) which is a simulated sea food is one of traditional foods which has been utilized frequently in Japan from olden times and is also at present produced and sold on a large scale. To describe briefly the process for production of this kamaboko presently practiced: first the head and internal organs are removed from fish of white meat such as Alaska pollack, which step is followed further by removal of skin and bones by means of a machine to separate fish meat; the fish meat is further washed with a large amount of water, excessive water then being removed, and anti-denaturants such as sorbitol or polyphosphate are added to the washed minced meat, which is then frozen to provide frozen minced meat (called frozen "surimi"). The procedures up to this step are conducted on factory ships on the high seas, and the surimi is then transferred to factories on land. After thawing, the surimi is ground and mixed together with salt, sugar, seasonings, and other additives by means of a food cutter, and the like. The resultant kneaded meat is molded into round rods or shaped by piling on a thin wood slab in a certain quantity and then subjected to steaming and cooling to provide the final product. When it is produced from start to finish on land, the above freezing and thawing steps are unnecessary.

The food products thus obtained by steaming fish meat ground with salt and seasonings are generally called "neriseihin", and kamaboko is a typical example of such neriseihin. The name of kamaboko is applicable to almost all products of neriseihin except for fish meat hams and fish meat sausages, and it refers to elastic and white products which can be found in almost all markets in Japan.

The kamaboko of the prior art has been formed in shapes attached to slabs or in shapes of round rods as rolled with straws. However, in recent years, in place of the kamaboko with such shapes, shredded kamaboko or fibrous food products from fish prepared by sheafing fibrous kamaboko, obtained by formation of kneaded meat into fibers by extrusion through a nozzle, into shapes like simulated scallops, or crab meats have been palatably appreciated and produced in large amounts. Such fibrous food products from fish, like conventional kamaboko of the prior art, are held constantly at low temperatures at the stages of both distribution and consumption. For this reason, the scope of area for distribution has been limited, and it has been difficult to permit normal temperature distribution by exporting to foreign countries, carrying for mountain climbing, or transporting on expeditions and other long-period trips.

For the purpose of expanding the distribution area for kamaboko foods of the prior art and expecting the growth thereof in industries, attempts have been made to package them in cans. However, because of a large number of problems to be solved technically, there has been no commercially success in this technique. One problem resides in the heating to a high temperature during manufacturing of canned foods, which weakens the mouthfeel and the texture characteristic of kamaboko, that is, impairs the so called resilient texture ("ashi") of kamaboko, only to give a soft mouthfeel similar to "tofu" (soy bean curd). The second problem is the formation of brown-colored substances through the reaction of sugars and amino acids in kamaboko components during heating at a high temperature, whereby a favorable white color cannot be obtained. As the third problem, because of the heating at a high temperature under hermetically sealed condition in metallic cans, stuffy odors similar to those of sulfur type compounds derived from the starting materials of minced fish meat are generated to damage markedly the taste and flavor of the product, to produce a taste and flavor which are different from those of ordinary kamaboko.

These problems are entirely the same also in case of fibrous food products from fish.

Furthermore, when fibrous food products from fish required to be colored for simulating crabs or shrimps are to be canned, in addition to the problems as mentioned above, there is also encountered the problem of decolorization or discoloration of the red pigment caused by heating of the canned product to a high temperature or the problem of color flowing, that is, oozing or flowing of the color outside of the colored portion. Another problem of denaturation of the contents caused by such pigments also adds to the difficulty encountered under the present situation, whereby solution of these problems is further delayed.

SUMMARY OF THE INVENTION

Accordingly, an object of the present invention is to provide a process for producing fibrous simulated sea foods of good quality packaged in hermetically sealed containers, which will undergo no denaturation or discoloration even when packed in heat-resistant containers, heated to high temperatures and pressurized, to produce excellent texture of meat, color, and taste and flavor, whereby they can take the place of high-class canned sea foods of the prior art such as canned crab meat.

The present invention provides a process for producing fibrous simulated sea foods packaged in hermetically sealed containers, which comprises kneading a minced fish meat ("surimi") to which sodium chloride has been added, molding the kneaded surimi into a form resembling noodle strips, preparing fibrous fish meat by forming cuttings like the teeth of a comb on the noodle-like strips or cutting the noodle-like strips into the form of noodle-like filaments, sheafing and binding the fibrous fish meat by the use of a binder containing kneaded krill meat, and, after coloring a part of the surface of the bound product if necessary, heating under pressurization the bound product packaged in a heat-resistant container.

DETAILED DESCRIPTION OF PREFERRED EMBODIMENTS

In the present invention, as the starting material, a minced fish meat ("surimi") is used as in the production of ordinary kamaboko. And, the use of a surimi containing no sugar such as sucrose or glucose is preferred since it can resulting in a product with good color free from brown-coloration. Thus, as the surimi, the use of raw surimi of Alaska pollack, Atka mackerel, etc., or a frozen surimi containing sorbitol is preferred.

It is also possible to add to the starting material, similarly as in the preparation of ordinary kamaboko, an auxiliary starting material such as various fish meat (e.g., cuttlefish body meat), egg white, vegetable proteins (e.g., soybean protein), starch, oils and fats, and seasonings, or an additive such as extracts or flavors of crab or scallop for imparting crab-like or scallop-like flavor.

In ordinary cases, a sweet "sake" ("mirin") is often added as a seasoning or a glaze, but the use of this additive is not desirable in the present invention because it will cause marked brown coloration when can packaging is practiced with the use of this additive. In the present invention, in place of such mirin or salted mirin, it is possible to use a distilled alcohol type seasoning such as distilled sake ("shochu"), brandy, whisky, or rum.

The minced fish meat thus admixed according to necessity with various auxiliary starting materials is kneaded with an appropriate amount of sodium chloride to dissolve out salt-soluble proteins to provide a viscous paste-like salted kneaded meat. The salted kneaded meat is formed into flat thin films in a form similar to noodle strips by means of an extruding nozzle with a slit die or a spray gun. The thin film has a thickness preferably within the range of from 0.5 to 5 mm.

Then, in order to impart fibrous mouthfeel, this thin film of noodle strip form is provided with cuts to leave parts resembling comb teeth or is cut into noodle-like filaments thereby to prepare a fibrous fish meat. That is, one method does not cut the strip into completely independent filaments, but leaves slightly uncut portions, thereby creating a state not of loose filaments but of a lightly overlapped mass of filaments and imparting a fibrous form and good mouthfeel. For this purpose, on the aforesaid thin film shaped like a noodle strips, cuttings are formed like the teeth of a comb by means of a roll type cutter having a comb-like striae. Or, alternatively, in order to cut the strips into completely independent filaments, the aforesaid thin films resembling noodle strips are cut into noodle-like filaments by means of a round-bladed cutter, etc. It is also possible to cut the thin films into noodle-like filaments by means of the aforesaid roll type cutter. The width of each cutting and the width of each noodle-like filament are each desirably within the range from about 0.5 to 3 mm.

For reinforcement of the network structure of fish meat protein, the general practice is to permit setting phenomenon ("suwari") to proceed with the meat in the state of noodle-like strips or noodle-like filaments. By this setting or suwari, the meat acquires a firm texture of meat without softening when packed in cans to impart a favorable mouthfeel. The setting may be carried out by any low-temperature setting method, high-temperature setting method, or two-stage setting method, but high-temperature setting at around 30° C. is more efficient.

The fibrous fish meat thus obtained after subjecting the fish meat to setting and forming cuttings like the teeth of a comb on the noodle-like strips or cutting the noodle-like strips into noodle-like filaments is then sheafed and bound with the use of a binder. In carrying out sheafing, a roller capable of gradually narrowing the widths, for example, is used to sheaf the fibrous fish meat so that it is wrapped with a plastic film or an edible film such as a film of fish meat. It is preferable thereby to collect a plural number of the respective filaments of the fibrous fish meat in a certain direction to bind up in the form of a round rod or a cylinder with a cross-sectional diameter of 5 to 50 mm.

In this sheafing step according to the present invention, kneaded meat of krill is used as the binder. As is well known, krill is a small crustacean which lives in a large number in the Antarctic Ocean and in texture of meat, taste and flavor is similar to shrimps or crabs. In the present invention, this kneaded meat of krill, either in the form of kneaded meat of krill only or in the form of a mixture of krill with minced fish meat, egg white, casein, a vegetable protein, starch, thickener, etc., conventionally used as this kind of binder, is used as the binder. When used as a mixture, it is preferable that the kneaded meat of krill comprise 30 wt % of the binder. The binder is also preferably used in an amount within the range of from 5 to 30% by weight, based on the weight of the fibrous fish meat. Krill may be utilized in any desired form such as paste, collected meat, peeled meat, or minced meat.

Generally speaking, when a fibrous simulated sea food having taste and flavor resembling those of crabs, shrimps, scallops, etc., is to be prepared from minced fish meat, it is inevitably necessary to add a seasoning or a spice such as extracts extracted from crabs, shrimps, scallops, etc. These seasonings or spices readily acquire a brown color when heated to a high temperature during production of canned foods and also are liable to be denatured in taste and flavor. In contrast, we have found that the meat of krill is not discolored into a brown color and changed to acquire an objectionable taste or smell, but it has the effect of enhancing the taste and flavor like those of crabs, scallops or shrimps and can prevent denaturation because of the seasonings or spices of the aforesaid extracts, thus proving to be an optimum material for taste and flavor.

Moreover, when the kneaded meat of krill is previously mixed with the minced fish meat which is the starting material, the gel strength is impaired because of the influence of water-soluble proteins or proteases contained in the krill to give physical properties or mouthfeel which cannot withstand high temperature heating. The same results were obtained when krill was employed after deactivation of proteases by heat treatment. Further, when krill was employed as a seasoning in a brine during packaging in cans, undesirable effects such as damaging of appearance due to flow-out of curd occurred. Thus, in the present invention, in order that the taste and flavor of krill be suitably utilized without impairing the texture or mouthfeel as fibrous simulated foods when packaged in cans, the kneaded meat of krill should be used as the binder in the sheafing binding step. As a result of using the kneaded meat of krill as the binder in the step of sheafing fibrous fish meat like the teeth of a comb or noodle-like filaments, fibrous simulated sea foods packaged in cans which have excellent texture, color and flavor can be obtained. This constitutes a unique feature of the present invention.

After sheafing and binding of the fibrous fish meat into bundle-like fibrous fish meat, a part of the surface is colored according to necessity. Ordinarily, it is colored red in order to impart an appearance as well as taste and flavor resembling those of crabs or shrimps. The colorant to be used must be one which is not discolored or decolored by heating during packaging in cans and is also free from flowing-out of the color from the colored portion. For this purpose, it is suitable to employ krill paste, a coloring pigment extracted from krill or an oil soluble natural pigment (e.g., paprika and oleoresin). Of these colorants, krill paste and a coloring pigment extracted from krill are highly preferred from the standpoint of the problem in taste and flavor. When a colored kneaded meat prepared by adding these colorants to kneaded meat such as minced fish meat in a proportion of 1 to 20% is coated and colored on a part of the external surface of the bundle-like fibrous fish meat, color and appearance resembling those of crabs or shrimps are imparted to the bundle-like fibrous fish meat. In the case of producing foods having taste and flavor like those of scallops, the bundle-like fibrous fish meat is transferred to the next step without coloration.

After coloration at a part of the surface as necessary, the bundle-like fibrous fish meat is cut into desired lengths, after which coagulation by heating is carried out. Heating may be conducted according to any desired method such as steaming and roasting, but steaming is preferred.

After coagulation by heating, the bundle-like fibrous fish meat is packed in an empty can, which step is then followed by degassing, roll fastening, pressurization and heating, according to the conventional can packaging process to provide packaged cans of fibrous simulated sea foods. During this operation, the pH of the contents is adjusted within the range from 6.0 to 6.7 with the use of a brine. By adjustment of the pH within such a weakly acidic range, the contents will be prevented from undergoing brown coloration, even when the can is heated to a high temperature, and also will not be weakened in mouthfeel or texture of meat, whereby a good product with excellent and stable taste and flavor is produced.

The present invention has been described with reference only to can packaging, but the present invention is not thus limited. It is also possible to charge the bundle-like fibrous fish meat into a heat resistant bag container such as one of aluminum laminated pouch, etc., and then to carry out vacuum packaging, pressurization and heating, to produce retort foods. The present invention is also inclusive of the embodiments thereof packaged in such heat resistant containers.

Thus, there can be obtained fibrous simulated sea foods packaged in hermetically sealed containers by packaging the fibrous fish meat bound with the kneaded meat of krill in heat resistant containers, and then carrying out pressurization and heating. According to such a procedure, all of the problems of weakening of meat texture during heating to high temperatures, offensive smell such as stuffy smell, objectionable taste, brown coloration, flow-out or ooze-out of colorants can be overcome to make possible packaging or retort food production of kamaboko which has been deemed to be difficult. Also, simulated sea foods packaged in cans and having good texture, color and flavor similar to those of crabs or scallops can be effectively produced from minced fish meat, which can take the place of canned crabs or canned scallops of the prior art which have been considered to be high-class canned foods.

By the realization of such fibrous simulated sea foods packaged in hermetically sealed container, a great contribution can be made to the expansion of the distribution area of kamaboko, to energy saving in and expanding growth of industries, such as exporting abroad of kamaboko, to safe portage during mountain climbing or expeditions, and to distribution without any facility for low temperature maintenance, and so forth. Thus, the present invention provides a really excellent food and a process for production thereof.

The present invention is further illustrated by the following Experimental Examples and Examples.

EXPERIMENTAL EXAMPLE 1

Fibrous simulated sea foods were prepared in a conventional manner according to the formulation of the starting materials as shown in Table 1. These were packaged in empty cans, degassed and hermetically sealed, roll fastened, and heated under pressurization at 116° C. for 90 minutes to provide packaged cans. The qualities of the foods in these cans were judged by organoleptic test, whereupon the results shown in Table 2 were obtained.

TABLE 1

| Experiment | Formulations of fibrous simulated sea foods (wt. %) | | | |
|---|---|---|---|---|
| | A | B | C | D |
| Formulations of starting materials: | | | | |
| Frozen minced meat of Alaska pollack prepared on factory ships: | 100 | 100 | 100 | — |
| Raw minced meat of Alaska pollack: | — | — | — | 100 |
| Sodium chloride: | 2.5 | 2.5 | 2.5 | 2.5 |
| Crab extract: | 2 | — | — | — |
| Binder meat: | | | | |
| Kneaded meat of Alaska pollack: | 10 | 10 | — | — |
| Kneaded meat of krill: | — | — | 10 | 10 |
| Colorant: | | | | |
| Monascorubrin pigment: | 1.5 | 1.5 | — | — |
| Krill pigment: | — | — | 1.5 | 1.5 |

TABLE 2

| Experiment | Quality evaluation of fibrous simulated sea foods | | | |
|---|---|---|---|---|
| | A | B | C | D |
| Brown coloration | +++ | + | + | — |
| Discoloration | ++ | ++ | — | — |
| Color flow | + | + | — | — |
| Offensive smell | ++ | +++ | — | — |
| Taste | Weak crab taste | No crab taste | Good | Good |

Note
The mark + indicates generation of denaturation, the degree of denaturation being greater with increase in the number of the marks, while the mark − indicates no generation of denaturation.

As a result, in Experiments A to C employing frozen minced meat of Alaska pollack prepared on factory ships and containing sugar as a preventive for freezing denaturation, brown coloration was seen. In contrast, in Experiment D, there was no brown coloration, and the color and the taste were good because of binding with kneaded meat of krill.

EXPERIMENTAL EXAMPLE 2

Experiment D-1 was conducted as in Experiment D in Experimental Example 1 except that the setting treatment was performed at 20° C. for 3 hours. Experiment D-2 was conducted without application of such a setting treatment. Each sample was adjusted to various pH with acidic sodium pyrrolate and canned similarly as in Experimental Example 1. The physical properties of the fibrous simulated sea foods in the cans obtained were evaluated by measurements of the cutting strengths by means of a Rheometer (produced by Fudo Koyo Co.) to obtain the results shown in Table 3.

TABLE 3

| Experiment | Cutting strength of crab-like simulated sea foods | | | | | | | | |
|---|---|---|---|---|---|---|---|---|---|
| | D - 1 | | | | | D - 2 | | | |
| pH | 5.8 | 6.0 | 6.5 | 6.7 | 7.2 | 5.8 | 6.5 | 6.7 | 7.2 |
| Cutting strength(g) | 640 | 1030 | 1350 | 1210 | 720 | 290 | 415 | 460 | 355 |

The cutting strength is the value of the cutting stress at the instant when the sample was cut at a sample stand speed of 6 cm/min. by the use of a knife adapter.

As a result, by employment of a setting treatment, it has been confirmed that good mouthfeel can be maintained, and the pH at the time of pressurization and heating has a great influence on the mouthfeel, indicating that a pH around 6 to 6.7 is desirable.

EXAMPLE 1

A mixture of 100 kg of frozen minced meat of Alaska pollack containing 6% sorbitol, 10 kg of starch, 2.8 kg of sodium chloride, 1.8 kg of a seasoning mixture, 2 kg of a vegetable protein, 1 kg of distilled sake and 30 kg of ice-water was kneaded with a food cutter to provide a kneaded meat, which was then extrusion molded onto a steel conveyor in the form of noodle-like strips of a thickness of 2 mm, set at 30° C. for 10 minutes, and then formed as cuttings resembling teeth of a comb at intervals of 1 mm by a cutting roller having a cutting portion resembling teeth of a comb. This meat was placed on a plastic film coated with a red kneaded meat containing 30% krill paste and sheafed and bound into rods with a diameter of 15 mm, by being narrowed gradually while a paste-like salted kneaded meat of peeled krill meat was poured thereon. The rods thus obtained were cut into pieces of a length of 50 mm, which were then steamed for 15 minutes to obtain 140 kg of crab-like simulated sea foods. These were packed in Crab No. 2 cans, adjusted to pH 6.4, and sterilized at 118° C. for 80 minutes to provide cans of crab-like simulated sea foods. The cans were stored for one month and compared at two random samplings with a commercially available crab-like simulated sea foods under chilled distribution. As the result, the risk percentage was found to be 1%, indicating no significant difference. The product of this invention was of good quality.

EXAMPLE 2

A mixture of 5 kg of raw minced meat of Alaska pollack, 3 kg of raw minced meat of Atka mackerel, 2 kg of cuttlefish body meat, 230 g of sodium chloride, 300 g of a seasoning and 20 g of scallop flavor was kneaded to prepare noodle-like strips, which were then extruded into noodle-like filaments with thicknesses of 1.5 × 1.5 mm and set at 28° C. for 30 minutes. To these filaments was added a kneaded meat of krill body meat (salted meat of peeled krill meat which was mixed with water into a paste-like material) to carry out sheafing and binding into a rods with a diameter of 30 mm, which were then heated for coagulation and cut into a width of 20 mm to obtain 10.5 kg of a scallop-like simulated sea food. This was packed in lots each of 100 g into aluminum laminated pouches, injected with 20 g of an aqueous sodium chloride of pH 6.5, subjected to vacuum packaging and heated under pressurization at 118° C. for 18 minutes.

The scallop-like simulated sea food packaged in retort pouches was free from brown coloration or discoloration similarly as commercially available scallop-like simulated food under chilled distribution, and it was also found to have good color as well as good taste and flavor without offensive smells such as a stuffy smell or a burned smell, exhibiting also no deterioration in mouthfeel.

What is claimed is:

1. A process for producing fibrous simulated sea foods packaged in hermetically sealed containers, which consists essentially of kneading a minced fish meat without sugar to which meat sodium chloride has been added, molding the kneaded meat into the form of noodle-like strips, preparing fibrous fish meat by forming cuttings like the teeth of a comb on the noodle-like strips or cutting the noodle-like strips into the form of noodle-like filaments, subjecting the thus-cut fibrous fish meat to setting in the state of noodle-like strips or noodle-like filaments for a time sufficient to acquire a firm texture, sheafing and binding the fibrous fish meat by the use of a binder containing kneaded krill meat, said kneaded krill meat being used in an amount sufficient to enhance the taste and flavor of said fibrous simulated sea food, and, after coloring a part of the surface of the bound product according to necessity, heating to coagulate said product and then packaging the bound product in a heat-resistant container; heating the bound product under pressurization in said container, wherein the pH value of the contents of the container when said product is packaged therein is in the range of 6.0 to 6.7.

2. A process according to claim 1 in which the minced fish meat without sugar is raw minced fish meat or frozen minced fish meat containing sorbitol.

3. A process according to claim 1 in which the coloring agent used in the coloring step is selected from krill paste, coloring matter extracted from krill, and oil-soluble red coloring matter.

4. A process according to claim 1 in which the binder is used in an amount of 5 to 30%, based on the weight of the fibrous fish meat.

5. A process according to claim 4 in which the binder is kneaded krill meat.

6. A process according to claim 4 in which the binder is a mixture containing krill in an amount of 30% by weight of the binder.

7. A process according to claim 1 in which the setting temperature is around 30° C.

* * * * *